A new curable amorphous terpolymer having a high curing rate, which consists of two alpha olefins, e.g. ethylene and propylene, and a polyene having two conjugated double bonds and represented by the formula:

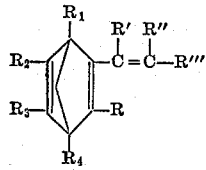

wherein

R is H or alkyl and $R_1$, $R_2$, $R_3$, $R_4$, $R'$, $R''$ and $R'''$ may be H, alkyl or aryl, is prepared by polymerizing the two alpha olefins and the polyene in the presence of a compound of a transition metal of Groups IV to VIII of the Periodic Table and a reducing aluminum compound represented by the formula:

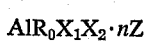

wherein $R_0$ is H or a hydrocarbon radical having 1 to 10 C atoms; each of $X_1$ and $X_2$, which may be the same or different, is H, a hydrocarbon radical having 1 to 10 C atoms, halogen or a secondary amine radical; Z is a Lewis base; and n is 0–2.

---

The present invention relates to new curable amorphous olefinic terpolymers obtained starting from alpha-olefins and polyenes containing two conjugated double bonds and to the process for obtaining same.

Particularly the present invention relates to new terpolymers consisting of two alpha-olefins and a polyene hydrocarbon containing two conjugated double bonds and having the following general formula:

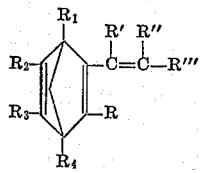

wherein R is hydrogen or an alkyl radical, $R_1$, $R_2$, $R_3$, $R_4$, $R'$, $R''$ and $R'''$ may be hydrogen, alkyl or aryl radicals.

Terpolymers are known which are formed from ethylene, propylene, or other olefins and diene compounds. It has, however, been observed that these terpolymers, while showing a high utilization of the diene monomer and a very good stability towards chemical agents, particularly towards chemical action of ozone and atmospheric agents, on account of their low degree of unsaturation, suffer from the disadvantage of having a rather low curing rate.

Furthermore, the vulcanization reaction sometimes continues ad infinitum, i.e. without having a real end. This drawback adversely affects the properties of the terpolymer and considerably limits its use, because, besides affecting the characteristics of the same polymers, it does not allow a satisfactory covulcanization with other usual elastomers having a high vulcanization rate of the resulting terpolymer is over 100% greater than that of a corresponding terpolymer containing traditional diene compounds. The terpolymers, according to the present invention, can be obtained by any one of the known methods of polymerization.

Examples of suitable alpha-olefins are ethylene, propylene, butenes, pentenes, methylpentenes, hexenes and the like. Preferably use is made of the ethylene-propylene couple.

Examples of suitable termonomers include the following:

(I) 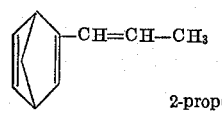

2-propenyl-norbor-2, 5-diene (II) 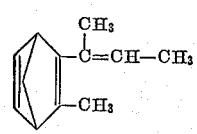

2-butenyl-2'3-methyl-norbor-2,5-diene (III) 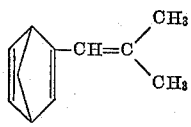

Isopropyliden-norborna-dienyl methane

Obviously it is possible to employ mixtures of the polyene compounds aforesaid instead of a single termonomer. The termonomers according to the present invention are easily obtainable at cheap prices.

For example it is possible to employ the methods of preparation described in our copending patent application Ser. No. 109,009, filed Jan. 22, 1971. According to another aspect of the present invention there is provided a process for preparing the inventive terpolymers which comprises polymerizing a mixture of the two different alpha-olefins and the polyene in the presence of a polymerization catalyst. An example of a suitable polymerization catalyst comprises a compound of a transition metal of Group IV to VIII of the Periodic Table and a reducing aluminum compound having the general formula

wherein $R_0$ is selected from hydrogen or hydrocarbon radicals having 1 to 10 carbon atoms; each of $X_1$ and $X_2$, which may be the same or different, is a hydrogen atom, a hydrocarbon radical having 1 to 10 carbon atoms, a halogen atom or a secondary amine radical; Z is a Lewis base; and n is 0, 1 or 2.

Alternatively, the aluminum compound may be a polyiminoalane, as described in Italian Pat. 778,353 of the same applicants.

The polymerization reaction can be carried out in the presence of an inert hydrocarbon solvent or in the same monomers (alpha-olefins) kept in the liquid state. The catalyst may be preformed in the presence or absence of one monomer or can be preformed in "situ." The temperatures are those usually employed in this type of reaction and may, for example, range from −60° to 100° C. Use is made of pressures between the pressure necessary to maintain at least partially the monomers in the liquid phase and 100 atmospheres, preferably from 1 to 80 atmospheres. In the case when the two alpha-olefins are ethylene and propylene, the preferred ratio between these two monomers ranges from 1:4 to 4:1, preferably from 1.5:1 to 1:3. Preferably the polyene constitutes from 1 to 25% by weight of the terpolymer.

The present invention is now illustrated by the following unrestrictive examples. In the examples the course of the vulcanization reaction is studied by the torque registered by an oscillating plate vulcameter (rheometer Zwick type) during the vulcanization. The torque is proportional to the degree of vulcanization. It is assumed that the maximum variation of the torque is the difference between the torque measured after the first 350 minutes of vulcanization, and the torque initially measured, i.e. $G_{250}-G_{min}=G_{max}$; furthermore, it is assumed that the concentration of double bonds at a time $t$ is $G_{250}-G_t$, i.e. the difference between the assumed maximum and the torque at time $t$.

The vulcanization rates, measured under the specified conditions, with a sulphur excess, depend substantially only on the concentration of double bonds. The course of the vulcanization reaction satisfies a kinetic equation of the second order which may be expressed as follows:

$$\frac{dG_t}{dt} = K(G_{max}-G_t)^2$$

From this it is possible to evaluate the vulcanization rate constant K, once $G_{max}$ and $t_{90}$, which is the time required to obtain 90% of $G_{max}-G_{min}$ are known, using the following equation:

$$K = \frac{1}{G_{max} \cdot t_{90}}$$

EXAMPLE 1

500 cc. of anhydrous n-heptane were introduced into an 800 cc. glass reactor under a nitrogen stream; the apparatus, equipped with an efficient stirrer, a loading funnel and a thermometer sheath, was put into a thermostatic bath at 0° C. and was kept at this temperature for the whole polymerization time.

Then a gaseous mixture of propylene and ethylene having a propylene/ethylene molar ratio of 2.5 and a flow rate of 600 N lt./h. was blown in n-heptane for about 30 minutes. The reaction was started by introducing into the reactor 2.4 mmoles/lt. of $AlEt_2Cl$ and increasing the stirring to about 1200 r.p.m. Immediately 15 ml. of a solution obtained by dissolving 2 ml. of the compound I into 50 cc. of n-heptane and 0.4 mmole/lt. of vanadium-triacetylacetonate were dropped into the reactor, a gaseous stream of ethylene and propylene continuing to be blown in. The adding of the remaining termonomer solution was carried out in 10 minutes at the amounts of 10-5-4-3-3-3-3-2-1-1 cc. per minute. The polymerization continued for 12 minutes; it was stopped by the addition to the reactor of a few ml. of n-butanol.

The final solution was washed by carrying out a suitable emulsion by adding 500 cc. of $H_2O$ to which 1% of surface-active agent (Drezinate) had been added; the emulsion was vigorously stirred for 30 minutes, then it was broken by the adding of 50 cc. of pure acetic acid. The watery phase was removed, and the polymer solution was still washed by 500 cc. of $H_2O$ containing 6 g. of the sodium salt of EDTA (ethylenediaminotetracetic acid), while the pH was regulated at about 4.5 by adding acetic acid. The obtained mixture was powerfully stirred for 30 minutes, then twice washed by water. In such a way the inorganic residuals were totally removed from the organic phase. The terpolymer solution was coagulated by the addition of an excess of acetone; after drying, 15.9 g. of uncoloured elastomer were obtained, containing an amount of oxides (catalyst residuals) lower than 100 p.p.m.

Upon X-ray examination the obtained polymer was completely amorphous and showed a $C_2$ content of 56% whereas its intrinsic viscosity, measured in toluene at 30° C., was 1.95 dl./g.

The U.V. examination of a terpolymer sample, showed the presence of conjugated double bonds ($\lambda_{max}=224$ m$\mu$); with reference to the pure termonomer, it was possible to calculate an amount of the Compound I of 8% b.w. based on the observed absorption; the same amount was obtained by a titration of a terpolymer sample (purified by dissolving and reprecipitating it) by means of an acetic solution of IBr.

A fraction of the terpolymer was subjected to curing at 145° C. in an oscillating plate Zwick rheometer having a twist angle $\alpha=1.5$, using the following formulation:

| | Parts |
|---|---|
| Polymer | 100 |
| HAF (carbon black) | 50 |
| $Z_nO$ | 5 |
| Circosol 4240 | 5 |
| MBT (mercaptobenzothiazole) | 0.5 |
| TMT (tetramethylthiuram disulphide) | 1 |
| Sulphur | 2 |

The following results were obtained:

$t_1$=(induction time)=3″

$t_{50}$=(time required to obtain 50% of the maximum modulus)=3′30″

$t_{90}$=(time required to obtain 90% of the maximum modulus=18′

K=(rate constant for the whole vulcanization reaction)=0.095 min.$^{-1}$ m.$^{-1}$ kg.$^3$ $G_{max}$=(maximum torque measured at the end of the vulcanization)=0.350 m. kg.

$G_{min}$=0.05 m. kg.

EXAMPLE 2

By working according to Example 1 and employing 2.5 ml. of the Compound II, the following results were obtained:

| | |
|---|---|
| Yield | 15.2 g. |
| Percent termonomer | 9.5%. |
| $[\eta]_{30}$ | 2.05. |
| $t_1$ | 3′30″. |
| $t_{50}$ | 3′. |
| $t_{90}$ | 18′30″. |
| $G_{max}$ | 0.320 kg. m. |
| $G_{min}$ | 0.08 kg. m. |
| K | 1.39 min.$^{-1}$ m.$^{-1}$ kg.$^{-3}$. |

What we claim is:

1. A curable amorphous olefinic terpolymer having a very high curing rate consisting of ethylene, and an alpha-olefin having 3 to 10 carbon atoms, the ratio of ethylene to alpha olefin being from 1:4 to 4:1 and from 1–25% by weight of a polyene hydrocarbon containing two conjugated double bonds according to the following formula:

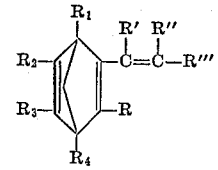

in which R is hydrogen or an alkyl radical, $R_1$, $R_2$, $R_3$, $R_4$, R′, R″ and R‴ may be hydrogen, alkyl or aryl radicals.

2. Terpolymer as claimed in claim 1 characterized in that the termonomer consists of a mixture of the aforesaid polyene compounds.

3. Terpolymers as claimed in claim 1 characterized in that the alpha-olefin is preferably selected from propylene, butenes, pentenes, methylpentenes and hexenes.

4. Terpolymers as claimed in claim 3 characterized in that the alpha-olefin is propylene.

5. Terpolymers as claimed in claim 1 characterized in that the ratio between ethylene and propylene is from 1:4 to 4:1 and preferably from 1.5:1 to 1:3.

6. A process for preparing a terpolymer as claimed in claim 1 which comprises polymerizing a mixture of the two different alpha-olefins and the polyene in the presence of a catalyst system comprising:
(a) a compound of vanadium;
(b) a reducing aluminum compound having the formula:

$$AlR_0X_1X_2 \cdot nZ$$

wherein $R_0$ is selected from hydrogen or hydrocarbon radicals having 1 to 10 carbon atoms; each of $X_1$ and $X_2$, which may be the same or different, is a hydrogen atom, a hydrocarbon radical having 1 to 10 carbon atoms, a halogen atom or a secondary amine radical; Z is a Lewis base and $n$ is 0, 1 or 2.

7. A process as claimed in claim 6 characterized in that the reducing aluminum compound is a polyiminoalane.

8. A process as claimed in claim 6 characterized in that the polymerization reaction is carried out at a temperature of from −60 to +100° C. and a pressure of from 1 to 80 atmospheres.

9. A process as claimed in claim 6 characterized in that the polymerization reaction is carried out in the presence of an inert hydrocarbon solvent.

10. A process as claimed in claim 9 characterized in that the inert solvent is n-heptane.

11. A process as claimed in claim 6 characterized in that the polymerization reaction is carried out in the absence of solvent, the monomer being the reaction medium.

12. Elastomers obtained by curing the terpolymers as claimed in claim 1.

References Cited

UNITED STATES PATENTS 3,474,059  10/1969  Body _____ 260—27

JAMES A. SEIDLECK, Primary Examiner
R. S. BENJAMIN, Assistant Examiner

U.S. Cl. X.R.
260—79.5 B, 80.78